United States Patent Office
3,431,419
Patented Mar. 4, 1969

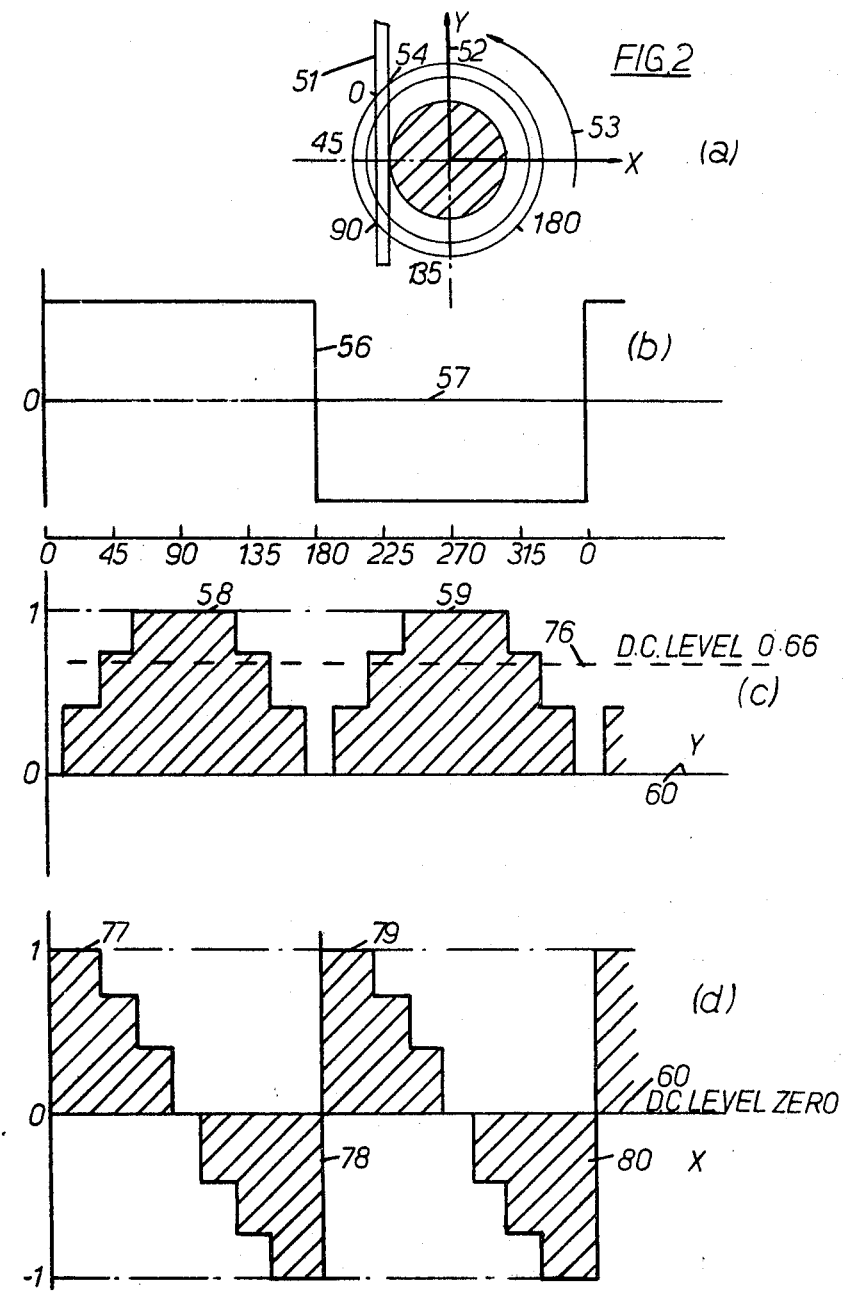

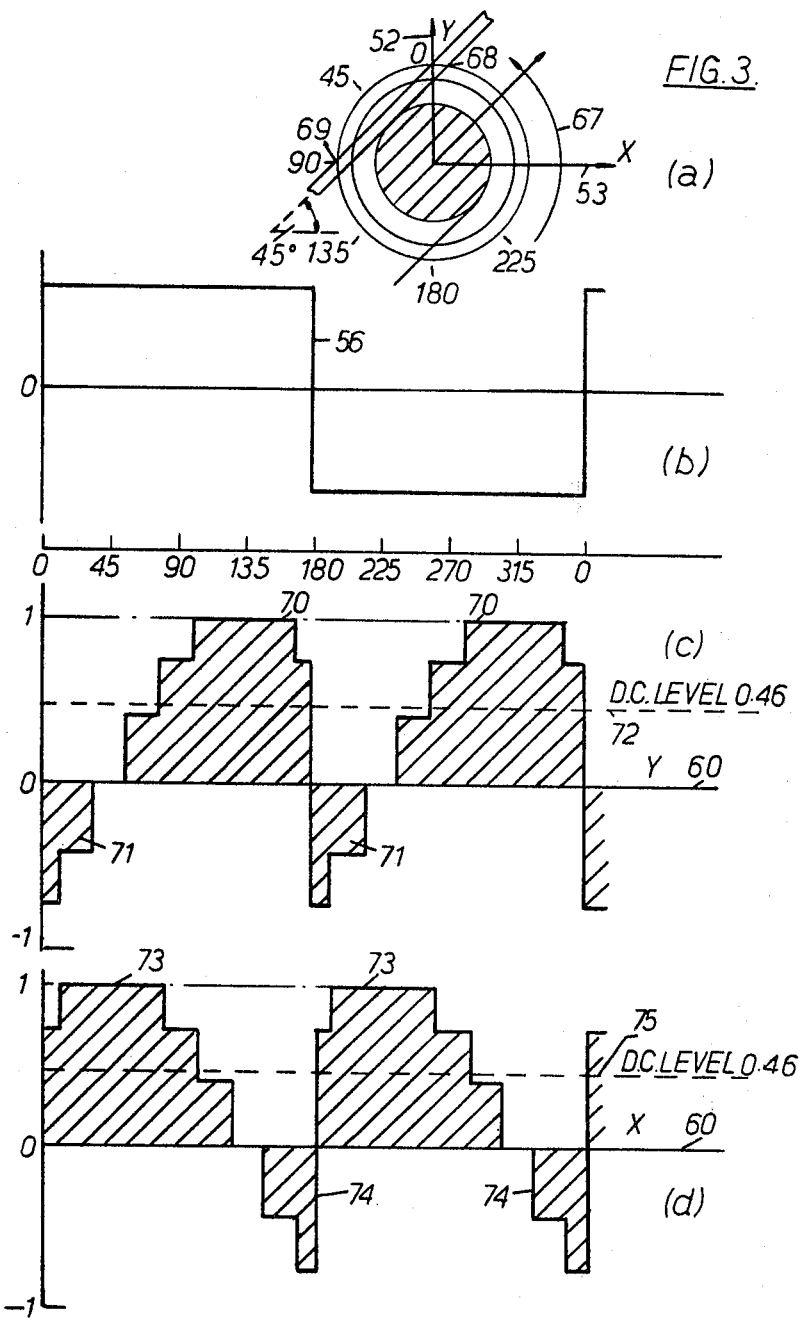

3,431,419
PHOTOELECTRIC LINE FOLLOWER EMPLOYING COORDINATE DRIVE MOTORS AND A CIRCULAR SCAN
Kenneth Victor Diprose and Arthur Stuart Forbes, Westbury-on-Trym, Bristol, England, assignors to Hancock & Co. (Engineers) Limited, Surrey, England
Filed Oct. 3, 1966, Ser. No. 583,817
Claims priority, application Great Britain, Oct. 1, 1965, 41,784/65
U.S. Cl. 250—202  7 Claims
Int. Cl. G05b 1/01

ABSTRACT OF THE DISCLOSURE

A photoelectric line follower employing coordinate drive motors and circular scanning in which a generated square wave is locked to a crossing point of the scanning circle, the square wave being modified to produce two repetitive waveforms having fundamental frequencies double the speed of scanning rotation, each waveform being associated with one co-ordinate and having a mean direct voltage value varying from a maximum when the outline is parallel to the respective co-ordinate down to zero when the outline is perpendicular thereto, each waveform being applied to an amplifier whose output drives the respective co-ordinate drive motor.

---

This invention relates to line following devices, such as are commonly used in oxygen jet cutting machines and in other types of automatic machinery.

It is often required to cut steel plates to particular shapes and oxygen jet flame cutting machines have been available for a number of years in which either a full-size drawing or a reduced-scale drawing, in either case bearing an outline of the shape to be cut, is placed at a sensing station in the machine and the machine then automatically guides an oxygen jet flame cutting torch in a path corresponding to the outline in order to cut the workpiece to the required shape, the outline being followed by a photoelectric line following device.

Line following devices are necessarily complex and many of them suffer from technical shortcomings of one kind or another. The principal object of the invention is to provide a line following device which is simple in conception and provides a high degree of technical perfection in following the outline accurately at high speed and producing an accurately cut workpiece.

The invention consists of a photoelectric line follower movable in directions parallel to two mutually perpendicular co-ordinates in order to follow the outline comprising rotatable means for scanning an area in the form of a ring crossing a portion of the outline to be followed, means to generate a square wave voltage locked in phase to one of the crossing points of the ring and the outline, means to modify the said square wave to produce two repetitive voltage waveforms each having a fundamental frequency equal to twice the speed of rotation of the scanning means, each waveform being associated with one of the co-ordinates, the modification of each waveform being such that its mean D.C. value is a maximum when the direction of the portion of the outline being followed lies parallel to the associated co-ordinate and ranges down to zero when the direction of the said portion is perpendicular to the associated co-ordinate, an amplifier for each waveform, and a motor energized by each amplifier to move the line follower in a direction parallel to the associated co-ordinate.

One well known method of line following consists in scanning the portion of the outline being followed either by means of a spot of light which vibrates to and fro across the outline, or by alternately illuminating the two sides of the outline. In either case the amount of light on the two sides of the outline is measured and if the following device is following the outline correctly the amount of the illumination on the two sides is equal, any inequality in the illumination of the two sides being detected by the photoelectric device, which actuates a servo mechanism to steer the line follower until the equality condition is restored. The oxygen jet cutter follows exactly the same path (or a path which represents a magnified version of the outline) over the workpiece.

In order that the line follower and the cutter may move in all directions in a single plane (which is invariably a horizontal plane) it is known practice to provide a co-ordinate drive consisting of two variable speed motors each arranged to drive the line follower and the cutting torch to and fro in a direction parallel to one co-ordinate, the two co-ordinates being mutually perpendicular, and the line follower must be arranged to provide two signals which control the power supply to the motors to cause them to rotate in the correct direction at the correct speed, so that the combined movement produced by the two motors drives the line follower and the cutter in the appropriate direction to follow the outline.

Instead of scanning across the line or illuminating the two sides of the line separately, it is also known to employ a circular scanning method by which either a spot of light is caused to trace out a circular path which crosses the outline, or in which the outline is illuminated and the photoelectric device is caused to "see" a small area while following a circular path, the points at which the ring or the circular path crosses the outline in either case generating two signals. A circular scanning method is used in the invention and one embodiment thereof will now be described with reference to the accompanying drawings in which:

FIGURES 2a to 2d show a square wave voltage and two generated waveforms when the outline is parallel to one of the co-ordinates; and FIGURES 3a to 3d show the square wave voltage and the generated waveforms when the outline lies at an angle of 45° to the two co-ordinates.

Figure 1:
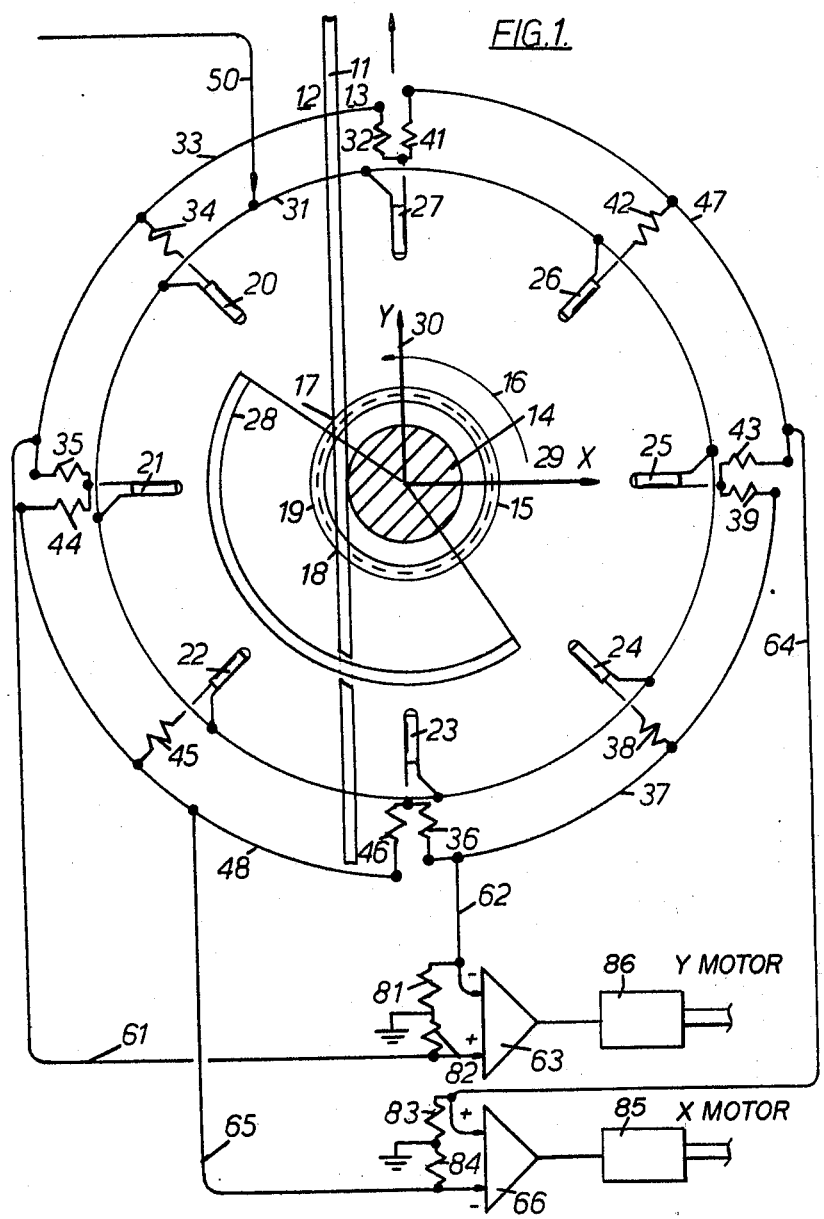
FIGURE 1 is a schematic diagram to illustrate the operation of the line follower according to the invention.

Referring to FIGURE 1, there is shown a representation of an outline 11 which is to be followed and it is assumed that the workpiece whose shape is being cut is on the left-hand side of the outline 11 on the drawing, represented by area 12, while the waste material 13, which is being cut away, is on the right-hand side of the outline. A circle 14 represents the diameter of the oxygen jet cutting flame but it will be understood that where the line follower according to the invention is used for other purposes it could represent the diameter of a cutter.

A ring 15 represents the scanning path of the photoelectric system. It could either be a small spot of light of a diameter equal to the width of the ring 15 which is caused to travel in a circle in the direction of the arrow 16 or, as an alternative, the area on which the outline is formed could be evenly illuminated and a photo-element, such as a photo-transistor, could be arranged to "see" a small spot and be so moved that a small circular area in the path is rotatably scanned to trace out the ring 15. In either case, a change in the output current of the photo-element occurs when the scanning area crosses the line at the point 17 and a second change in the photo-element output occurs when the scanning area re-crosses the line at the point 18. The arc 19 of the ring 15 subtends an angle at the centre of the area 14 which may lie between 45° and 135° but is preferably about 90°, as shown, so that the depth of the segment defined by the arc 19 is very roughtly one-sixth of the mean diameter of the ring 15.

The signal obtained from the photo-element at the crossing point 17 is caused to trigger a monostable circuit or flip flop which remains set for a time equal to one-half the time of a complete revolution of the scanning spot around the ring 15, so that the output of the flip flop is a square wave having a frequency exactly equal to the frequency of the ring scan, and this is applied to the line 31. This method of generating the square wave voltage ensures that after one rotation of the scanning spot the phase of the square wave is locked to the crossing point 17 and not to the crossing point 18.

In order to modify the square wave input voltage derived over line 31 a ring of photo-elements such as phototransistors 20 to 27 is provided. Although, in the present instance the ring consists of eight photo-elements it is possible to use more or less. These photo-elements are equally spaced around a circle centred on the axis of rotation of the scanning device and a central light source is provided to illuminate them but is obscured by a shutter 28 which rotates in synchronism with the scanning spot, the shutter covering an arc such that at least half the photo-elements are illuminated at any one time. The shutter actually covers an arc of 157½ degrees.

In the embodiment being described the arc 19 FIGURE 1 subtends an angle of 90° at the centre of area 14, but this angle need not be exactly 90°. When this angle is 90° the photo-elements are so arranged that the elements 21 and 25 lie along an axis 29, which is referred to herein as the X axis and is one of the co-ordinates along which one of the two co-ordinate drive motors moves the line follower, while the photo-elements 23 and 27 lie along an axis at a right angle to the X axis and referred to herein as the Y axis 30, and is the other co-ordinate along which the other co-ordinate drive motor moves the line follower. The photo-elements act purely as switches which are "on" when they are illuminated, i.e., not obscured by the shutter 28 and in this condition they pass current. The three photo-elements 27, 20 and 21, are arranged in one quadrant defined by the X and Y axes and a voltage applied to a line 31 connected to one side of all the photo-elements is applied through the element 27 when illuminated to one end of a resistor 32 connected at its other end to a common line 33. Similarly, when the photo-element 20 is illuminated, current passes from the line 31 through a resistor 34 to the line 33, and when the photo-element 21 is illuminated, current passes through this element and a resistor 35 to the line 33.

In the opposite quadrant, the photo-element 23, when illuminated, passes current from the line 31 through resistor 36 to a line 37, photo-element 24, when illuminated, passes current through a resistor 38 to the line 37, and photo-element 25, when illuminated, passes current through a resistor 39 to the line 37. The resistors 32, 34 and 35, on the one hand, and 36, 38 and 39, on the other hand, are so chosen that if a constant D.C. is applied to the line 31 their conductances are in the required ratios to produce a voltage across the input resistors 81 and 82 of an associated differential amplifier 63 which approximates to a sine wave as the shutter rotates. The output of the differential amplifier 63 supplies a Y drive motor 86. An exactly similar arrangement is made in respect of the two groups of three resistors 41, 42 and 43, and 44, 45 and 46 respectively feeding lines 47 and 48, so that if the constant D.C. voltage is applied to the line 31 a substantially sinusoidal vtoltage is developed across the input resistors 83 and 84 of the associated differential amplifier 66 whose output supplies an X drive motor 85. It will be evident that with a constant D.C. voltage on the line 31 the output waveform from the differential amplifier 63 is in phase quadrature with respect to the output waveform from the differential amplifier 66, and the frequency of both waveforms is locked to the rotation of the shutter 28 and the rotation of the scanning spot in the ring 15.

In operation the line 31 does not have a constant D.C. voltage applied to it. Instead, the square wave produced by the flip flop as previously described, is applied to it. In consequence this square wave is modified to produce two repetitive waveforms, one at the inputs of the amplifier 63 and the other at the inputs of the amplifier 66, having a fundamental frequency equal to twice the frequency of the square wave. This fundamental frequency is also equal to twice the speed of rotation of the scanning spot.

FIGURE 2a shows the situation in which the outline 51 is parallel to the Y axis indicated by the arrow 52. In the particular arrangement shown, the spot rotates in the direction of the arrow 53 and the first crossing of the outline takes place at the point 54 while the second crossing of the outline takes place at the point 55, the arc between the points 54 and 55 being 90° of spot rotation, as indicated on the drawing. Of course, it is not essential to arrange the line follower so that the arc is 90° but it is convenient to do so in the example being described.

FIGURE 2b shows the square wave voltage 56, which is symmetrical about a zero line 57.

FIGURE 2c shows the repetitive voltage waveform 58, 59 which appears at the input and output of the differential amplifier 63. If line 31 had a constant D.C. voltage applied to it the portion 59 of the waveform would lie below the zero line 60, but the change in the polarity of the square wave voltage applied to line 31 has the effect of inverting this portion. Since the outline 51 is parallel to the Y axis 52 the maximum speed is required in the Y direction and no movement is required in the X direction. The waveform 58, 59 lies entirely above the D.C. zero level 60, and drives the line follower in the Y direction.

FIGURE 2d shows the other waveform 77, 78, 79, 80, which appears at the input and output of the differential amplifier 66. Again if we assume the line 31 to be held at a constant D.C. voltage the portions 79 and 80 of the waveform would be respectively below and above the zero line 60, but the change in polarity of the square wave voltage applied to line 31 has the effect of inverting them. The resulting D.C. level obtained from the waveform 77, 78, 79, 80 is zero as an equal proportion of the waveform is situated above and below the D.C. zero line 60. The output from the differential amplifier 66 is zero and the X drive motor receives no driving voltage and therefore remains stationary. This is as it should be, since no X movement is required.

FIGURES 3a to 3d show the conditions which obtain when the line follower is instantaneously moving in a direction at an angle of 45° to the X and Y co-ordinates. In FIGURE 3a the arrows 52 and 53 indicate the Y and X directions as before and the direction of rotation of the scanning spot is indicated by the arrow 67. The first crossing of the outline by the spot now occurs at a point 68 while the second crossing occurs at a point 69, the arc traversed by the spot being 90° as before. The square wave 56 is locked in phase to the first crossing point of the spot over the outline so that the square wave is displaced by an angle equal to the displacement of the outline as between FIGURES 2a and 3a, i.e., 45°. On the other hand, the sequentially switched resistors 32, 34, 35, 36, 38, 39, 41, 42, 43, 44, 45 and 46 are fixed with respect to the X and Y co-ordinates of the machine and their output signals are consequently locked in phase with respect to the scanning spot rotation. Accordingly the output from the differential amplifier 63 is as indicated in FIGURE 3c, in which one portion 70 of each waveform is above the mean D.C. zero level line 60, while the remaining portion 71 of each waveform is below the line 60, the mean D.C. level of the waveform being at 72.

FIGURE 3d shows that the phase displacement of the square wave has also changed the conditions of the second waveform so that a portion 73 of each waveform is above the line 60, while another portion 74 is below the line 60, the mean D.C. level being at the line 75.

In the particular case shown, since the outline is at an angle of 45° to each of the co-ordinates the two levels 72 and 75 are the same, since the sine and the cosine of 45° are both 0.707, and there is a sine/cosine relationship between the two levels. If the maximum amplitude of the waveforms shown in FIGURES 2 and 3 is taken at 1 the level 76 of the waveform shown in FIGURE 2c is 0.66, while the levels 72 and 75 are both 0.66×0.707, which is equal to 0.46. In this case the outputs from the two amplifiers 63 and 66 are equal, the two respective motors run at the same speed, and the line follower accordingly moves in the direction of the outline, that is, at an angle of 45° to the X and Y co-ordinates.

If the outline shown in FIGURE 2a were to turn in a half circle so that the line follower would move in the opposite direction the generated waveforms would retain the phase position shown in FIGURES 2c and 2d but the square wave would be phase-displaced by 180°. Consequently the two waveforms would have the same shape but they would be inverted and the Y motor would run in the opposite direction. The same reasoning applies to the waveforms of FIGURES 3b, 3c and 3d.

The line follower arrangement provided by the invention is extremely simple in conception and requires the minimum of equipment. A consequence of the mechanical simplicity is that a high scanning frequency can be employed, which makes it possible to maintain accurate following at high rates of cutting. Moreover, the relative phases of all the moving parts and the signals are automatically locked to each other so that the accuracy of following is not impaired by small changes in the scanning frequency and a very high degree of accuracy can be achieved.

The photo-elements 20 to 27 act as switches, and it will be evident that other kinds of switch, either mechanical or electronic, may be used to generate the two repetitive waveforms, provided that they are operated in the correct sequence and in the correct phase relationship with respect to the rotation of the circular scanning device.

We claim:
1. A photoelectric line follower movable in directions parallel to two mutually perpendicular coordinates in order to follow the outline comprising rotatable means for scanning an area in the form of a ring crossing a portion of the outline to be followed, means to generate a square wave voltage locked in phase to one of the crossing points of the ring and the outline, means to modify the square wave voltage to produce two repetitive voltage waveforms each having a fundamental frequency equal to twice the speed of rotation of the scanning means, each waveform being associated with one of the co-ordinates, the modification of each waveform being such that its mean direct voltage value is a maximum when the direction of the portion of the outline being followed lies parallel to the associated co-ordinate and ranges down to zero when the direction of the said portion is perpendicular to the associated co-ordinate, an amplifier for each waveform, and a motor energized by each amplifier to move the line follower in a direction parallel to the associated co-ordinate.

2. A follower as claimed in claim 1 in which the means to modify the square wave voltage comprises a number of switches, rotating means associated with the scanning means to actuate the switches in sequence and to keep each switch actuated for a predetermined period, and a resistor associated with each switch, the switches and resistors associated with each quadrant of scanning rotation defined by the two co-ordinates being connected in a circuit, the values of the resistors being chosen to provide conductances such that if a constant direct voltage were applied to the circuit its output would approximate to a sine wave, the square wave voltage being applied to each circuit for modification by the circuit.

3. A follower as claimed in claim 2 comprising a first differential amplifier to which the modified square wave voltages from the circuits associated with two opposite quadrants are applied, a first motor fed by the output of the first differential amplifier to drive the line follower in directions parallel to one co-ordinate, a second differential amplifier to which the modified square wave voltages derived from the circuits associated with the other two opposite quadrants are applied, and a second motor to drive the line follower in directions parallel to the other co-ordinates.

4. A follower as claimed in claim 2 in which the switches are photoelectric elements, comprising a shutter rotatable with the scanning means, and illuminating means to illuminate all the photoelectric elements, the shutter being arranged successively to obscure the light from the photoelectric elements as the shutter rotates.

5. A follower as claimed in claim 3 in which the the switches are photoelectric elements, comprising a shutter rotatable with the scanning means, and illuminating means to illuminate all the photoelectric elements, the shutter being arranged successively to obscure the light from the photoelectric elements as the shutter rotates.

6. A follower as claimed in claim 1 so arranged that the crossing points of the scanning path and the outline subtend an angle of between 45° and 135° at the axis of the scanning path.

7. A follower as claimed in claim 5 so arranged that the crossing points of the scanning path and the outline subtend an angle of between 45° and 135° at the axis of the scanning path.

References Cited

UNITED STATES PATENTS

| | | | |
|---|---|---|---|
| 2,499,178 | 2/1950 | Berry et al. | 250—202 X |
| 2,892,948 | 6/1959 | Frantz | 250—202 |
| 3,004,166 | 10/1961 | Greene | 250—202 |
| 3,260,848 | 7/1966 | Gordon | 250—202 |

JAMES W. LAWRENCE, *Primary Examiner.*

E. R. LA ROCHE, *Assistant Examiner.*

U.S. Cl. X.R.

250—234; 315—152; 317—124